United States Patent
Petruska

(10) Patent No.: US 6,738,239 B2
(45) Date of Patent: May 18, 2004

(54) ACTIVE SNUBBER CIRCUIT FOR ELECTRICAL ROTARY ACTUATOR

(75) Inventor: David C. Petruska, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 41 days.

(21) Appl. No.: 09/795,045

(22) Filed: Feb. 26, 2001

(65) Prior Publication Data

US 2002/0118496 A1 Aug. 29, 2002

(51) Int. Cl.[7] .............................. H02H 5/04; H02H 7/09
(52) U.S. Cl. ............................................. 361/23; 361/30
(58) Field of Search ...................... 361/23, 84; 318/256, 318/299

(56) References Cited

U.S. PATENT DOCUMENTS

| | | | | |
|---|---|---|---|---|
| 3,890,551 A | * | 6/1975 | Plunkett ...................... 318/376 |
| 4,496,886 A | * | 1/1985 | Gordon ........................ 318/254 |
| 4,891,764 A | * | 1/1990 | McIntosh ..................... 364/508 |
| 4,904,918 A | * | 2/1990 | Bailey et al. ................ 318/762 |
| 5,270,597 A | * | 12/1993 | Yubazaki et al. .......... 310/49 R |
| 5,296,790 A | * | 3/1994 | Fincher ....................... 318/560 |
| 5,304,802 A | * | 4/1994 | Kumagai ..................... 257/328 |
| 5,552,976 A | * | 9/1996 | Munro et al. ................. 363/39 |
| 5,586,000 A | * | 12/1996 | Sakata et al. ................ 361/525 |
| 5,724,218 A | * | 3/1998 | Tihanyi ........................ 361/79 |
| 5,757,600 A | * | 5/1998 | Kiraly .......................... 361/84 |
| 6,016,234 A | * | 1/2000 | Blank .......................... 360/75 |
| 6,078,156 A | * | 6/2000 | Spurr .......................... 318/368 |

OTHER PUBLICATIONS

Staff, Feb. 01, 2001, Electronic Component News, High–Temperature Aluminum Electrolytic Capacitor.*

* cited by examiner

Primary Examiner—Stephen W. Jackson
Assistant Examiner—Zeev Kitov
(74) Attorney, Agent, or Firm—Leydig, Voit & Mayer, LTD

(57) ABSTRACT

A novel motor driver with an active snubber circuit. The motor driver is interposed between an external electrical power source and an electrical motor. The electrical motor is driven in first and second states such that the electrical motor produces an inductive flyback current when it switches torque direction. The motor driver comprises a reverse voltage protector in series between the power source and the electrical motor allowing flow of electrical power to the motor; and a capacitor arranged in parallel circuit with the motor between the motor and the diode (or other reverse voltage protector). The active snubber circuit is in parallel circuit with the motor between the diode and the electrical motor. The active snubber circuit comprises a switch having a sensor responsive to increases in the bus voltage resulting from the inductive flyback current and a resistor in series with the switch regulating electrical current flow.

18 Claims, 5 Drawing Sheets

ACTIVE SNUBBER CIRCUIT FOR ELECTRICAL ROTARY ACTUATOR

FIELD OF THE INVENTION

The present invention generally relates to motor drivers for electrical motors and more particular to apparatus and methods of dissipating regenerative inductive currents in motor drives.

BACKGROUND OF THE INVENTION

A schematic drawing of a prior art motor driver 10 for an electrical motor 12 (the ProAct Generation 1, which is a form of Limit Angle Torque motor (LAT) commercially available from Woodward Governor) is illustrated in FIG. 1. The motor driver 10 serves the purposes of conditioning the electrical power received from an external power source 14 and maintaining the proper electrical power levels for driving the electrical motor 12. The motor driver 10 includes a diode 16 for ensuring one reverse voltage protection, an electromagnetic (EMI) filter 17 for filtering out high frequency interference, and a bus capacitor 18 for storing electrical power and smoothing out any spikes or intermittent declines in the electrical power and a switch network for modulating electrical energy to the motor.

In the prior art circuit illustrated in FIG. 1, it should first be noted that the motor driver 10 is not integrated with electrical motor 12 but instead is intentionally mounted remotely such that the motor driver 10 is subject to relatively low temperatures of about a maximum of 85° Celsius. The motor 12 is driven by an H-bridge configuration comprising four switches 20, 21, 22, 24. When the first and fourth switches 20, 23 are closed (with switches 21, 22 open), the motor 12 is driven in a first rotational direction. When the second and third switches 21, 22 are closed (with switches 20, 23 open), the motor 12 is driven in a second rotational direction.

During normal steady state operation, the net flow of current is out of the motor driver 10 and into the motor 12. However, when it is desired to switch the direction of flow quickly and therefore switch the motor direction, the electrical motor 12 momentarily acts as a generator and forces inductive "flyback" current into the motor driver 10. If there were no line impedance 26, EMI filter 17 or diode 16, the inductive flyback current could be dissipated in the external power source 14 assuming that the power source 14 is capable of withstanding the amount of inductive energy produced by the motor 12. However, in prior art designs, the diode 16 has not allowed the electrical flow to reverse and is necessary to prevent destruction of the motor driver in the event that the battery is installed the opposite way. The way the prior art has dealt with this specific problem has been to incorporate an aluminum electrolytic capacitor 18 with a large capacitance of 3000 $\mu$F to handle and temporarily store this inductive flyback current load. The aluminum electrolytic capacitor 18 has allowed for a very high capacitance to volume ratio along with a low cost to capacitance ratio.

SUMMARY OF THE INVENTION

It is an objective of the present invention to provide an electrical motor that may include integral electronics including the motor driver, which can operate at an elevated temperature of over 100° Celsius (typical approaching about 115° Celcius) at which temperature aluminum electrolytic capacitors are not reliable.

It is a further objective in regard to the previous objective to achieve the foregoing object without creating cost or size drawbacks.

In accordance with these and other objectives, the present invention is directed toward a novel motor driver with an active snubber circuit. The motor driver is interposed between an external electrical power source and an electrical motor. The electrical motor is driven in first and second states such that the electrical motor produces an inductive flyback current when it switches between states. The motor driver comprises a reverse voltage protector in series between the electrical power source and the electrical motor allowing flow of electrical power to the electrical motor; and a bus capacitor arranged in parallel circuit with the motor (or switch network of the motor driver) between electrical motor and the reverse voltage protector. The active snubber circuit is arranged in parallel circuit with the bus capacitor (or switch network) between the reverse voltage protector and the electrical motor. The active snubber circuit comprises a switch having a circuit that senses an increase in voltage on the bus when inductive flyback occurs. A resistor is in series with the switch. When the voltage of the bus increases, the resistor is switched into the circuit and diverts the inductive flyback current. The snubber circuit dissipates inductive flyback current through the resistor.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 2:
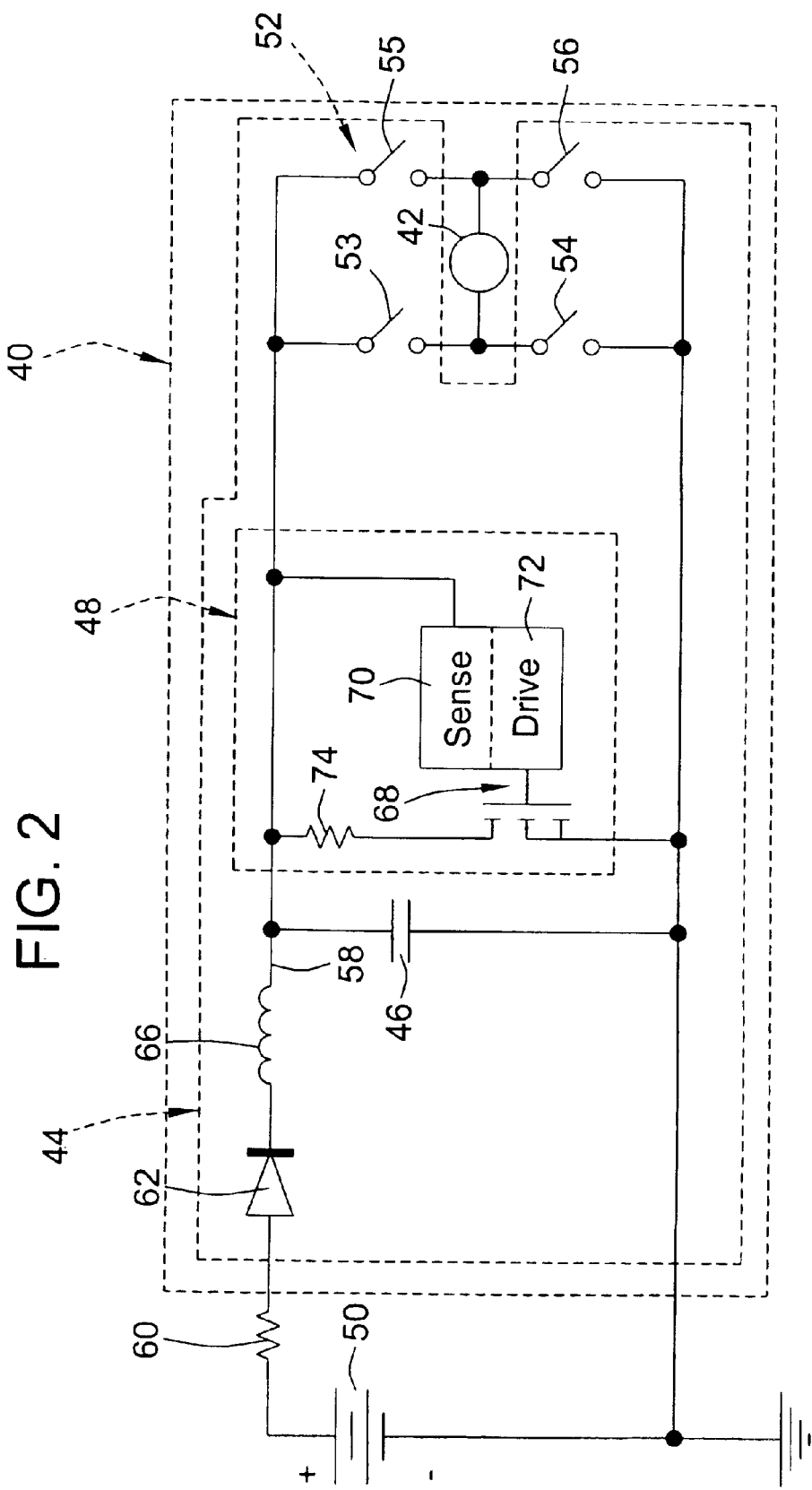
FIG. 2 is a schematic illustration of an electrical motor with an integral motor driver according to a first embodiment of the present invention.

For purposes of illustration a first embodiment of the present invention has been illustrated in FIG. 2 as a electrical motor unit 40 comprising an electrical motor 42 and integral electronics including a novel motor driver 44. The unit 40 can be electrically connected to an external or integrated power source 50 (shown herein as a battery for engine applications although non-battery sources are commonly used in turbine applications) for receipt of electrical power to drive the motor 42. Electrical motors of this type typically operate with a power source 50 that is between 8 and 32 volts and between 70 and 400 watts. Because the electronics (including motor driver 44) are integral with the motor 42, the unit 40 is typically sold and mounted as a single component without the need to mount the electronics assembly (including motor driver 44) separate or remote from the electrical motor 42. Further structural details and advantages of the unit 40 can be had to U.S. patent application Ser. Nos. 09/793,151, 09/793,356, 09/795,225, all filed on Feb. 26, 2001, and owned by the present assignee, the entire disclosures of which are hereby incorporated by reference.

The motor driver 44 is interposed on the bus 58 running from the electrical power source 50 to the electrical motor 42. The bus 58 has a natural line impedance 60. The motor driver 44 includes a reverse voltage protector in the form of a diode 60 for ensuring reverse voltage protection; an electromagnetic (EMI) filter 66 for filtering out high frequency interference on the bus 58; the bus capacitor 46 for smoothing out voltage spikes and natural inconsistencies in the electrical power flow to the motor 42; and a switch network (comprised of switches 53–56) for modulating electrical energy to the motor. The diode 62 is one form of a reverse voltage protector that prevents destruction of the motor driver in the event that the battery is installed the opposite way.

Because the motor driver 44 is integral with the electrical motor 42, the motor driver 44 is subject to an increased temperature environment. To deal with this environment, a different bus capacitor 46 has been selected and incorporated into the motor driver 44 and an active snubber circuit 48 has been added to deal with regenerative inductive flyback current. The bus capacitor 46 only has a capacitance of between 5 $\mu$F and 500 $\mu$F (60 $\mu$F in the preferred embodiment) sufficient to smooth out voltage spikes and natural inconsistencies in the electrical power flow to the motor driver electronics and for EMI conducted emission requirements. However, the type of bus capacitor 46 has been selected to reliably withstand the heat over 100° Celsius and up to 125° Celsius for over 30,000 hours of operation as a result of the electronics being integrated into the electrical motor unit 40. As a result of this selection, the bus capacitor 46 cannot reliably employ current aluminum electrolytic capacitor technology and has a much lower capacitance insufficient to reliably store the regenerative inductive flyback current that is produced by the electrical motor 42 as a byproduct of the electrical motor 42 being switched between states via the switch network. To achieve a switch in states, the electrical motor 42 is operatively arranged in an H-bridge circuit 52 comprising four switches 53–56 as an exemplary form of a switch network. When the first and fourth switches 53, 56 are closed (with switches 54, 55 open) in a first state, the motor 42 is driven in a first rotational direction. When the second and third switches 54, 55 are closed (with switches 53, 56 open) in a second, the motor 42 is driven in a second rotational direction. A third "free wheel" state is also provided in which switches 54 and 56 are closed. Torque is proportional to current. The current is modulated by the ratio of switch states (e.g. switching between first and third states to effect a selected torque in a first angular direction and switching between second and third states to effect a selected torque in a second angular direction).

Because the capacitor 46 does not have sufficient storage capacity for inductive flyback current, an active snubber circuit 48 has been employed for dissipating the inductive flyback current. The snubber circuit 48 includes a semiconductor switch 68 in parallel with the electrical motor 42 (or switch network 52) having a sensor 70 responsive to an increase in the bus voltage caused by an inductive flyback current and a driver 72 for closing the switch 68 and allowing the inductive flyback current to dissipate through a resistor 74 to ground. The snubber circuit 48 also includes the resistor 74 in series with the switch 68 to dissipate the energy and prevent the current from approaching an almost infinitive value when the switch 68 closes. The resistor 74 has a relatively low resistance of between 1 Ω and 3 Ω (2 Ω in the preferred embodiment) to provide for quick dissipation of the energy and is sized according to V-clamp peak divided by I-flyback peak. The preferred type of switch 68 is a n-channel metal oxide semiconducter field effect transistor also known as a MOSFET switch which is very fast and is activated by a power or current signal that has no significant impact on the motor driver 10.

According to the preferred implementation, the MOSFET switch 68 is responsive to the voltage of the bus 58. When the bus voltage goes high as a result of the motor 42 switching states, the drive signal to the MOSFET switch 68 goes high causing the MOSFET switch 68 to be driven closed and thereby allow drainage of the energy across the resistor 74. An advantage of the disclosed active circuit disclosed herein is that it may be "tuned" so that the snubber does not clamp at 32 volts but actively "snub" the voltage bus to keep it below 40 volts. This allows the use of lower voltage rated semiconductors in the Motor H-Bridge. This reduces power dissipation and package size while increasing thermal stress reliability.

Figure 3:
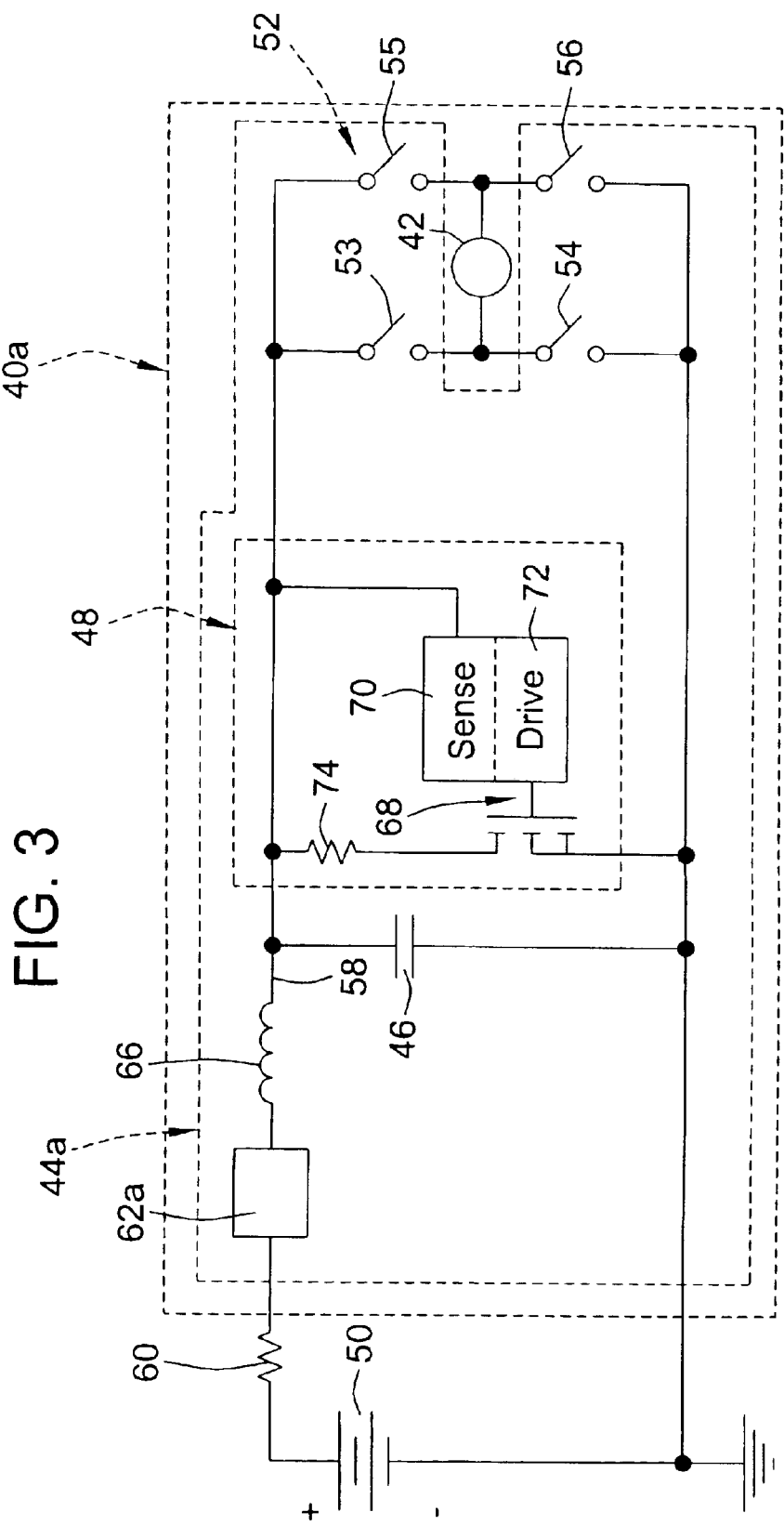
FIG. 3 is a schematic illustration of an electrical motor with an integral motor driver according to a second embodiment of the present invention.
Figure 4:
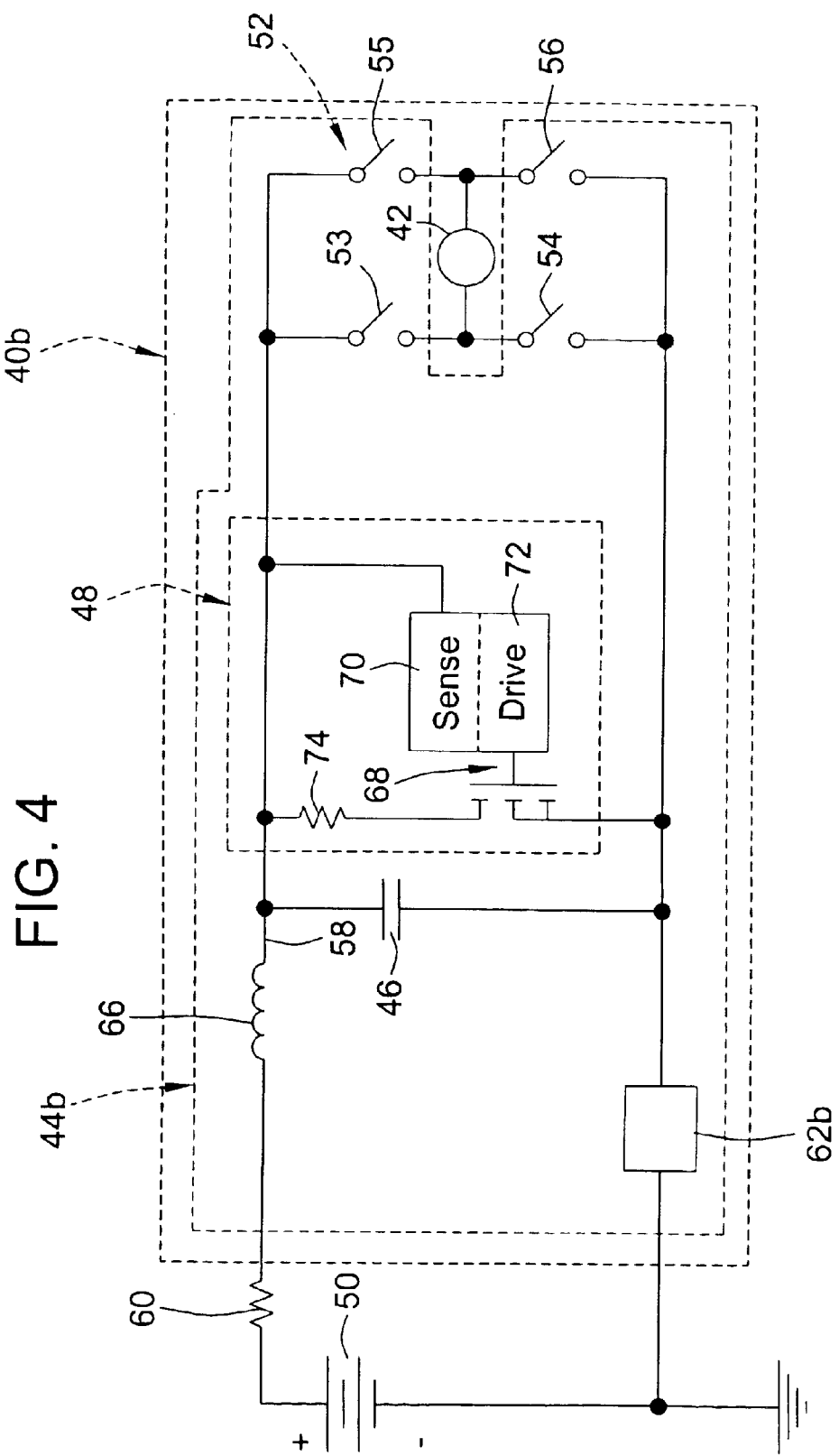
FIG. 4 is a schematic illustration of an electrical motor with an integral motor driver according to a third embodiment of the present invention.
Figure 5:
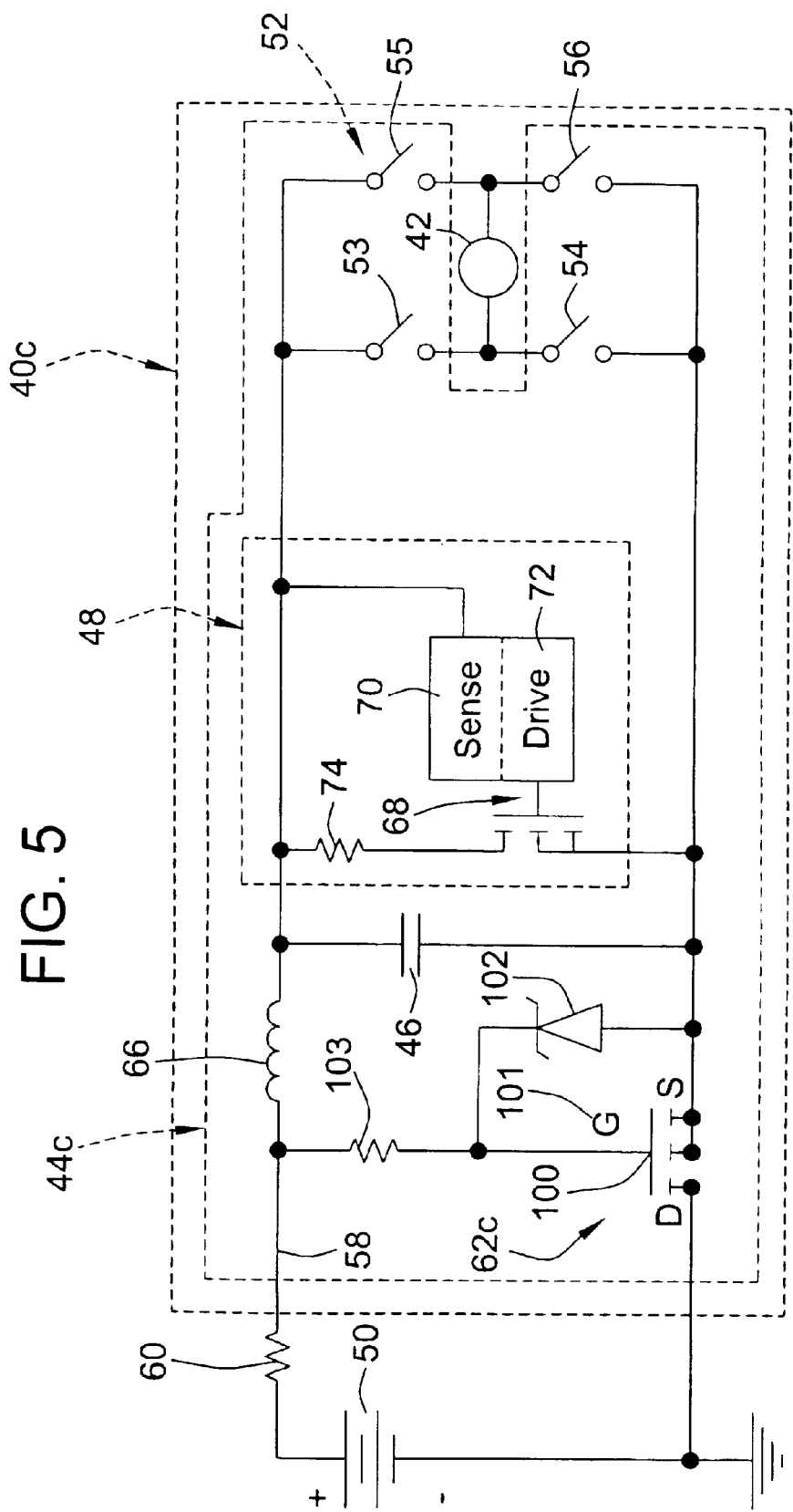
FIG. 5 is a schematic illustration of an electrical motor with an integral motor driver according to a fourth embodiment of the present invention.

Turning to FIGS. 3, 4, and 5, alternative embodiments of the present invention are illustrated in which different arrangements of reverse voltage protectors are provided. Like components have been designated with same reference numerals in FIGS. 3, 4, and 5 for purposes of ease of understanding. FIGS. 3 and 4 illustrate a motor unit 40a, 40b having a motor driver 44a, 44b with a reverse voltage protector 62a, 62b arranged in series with and interposed between the motor 42 (or the switch network) and the battery 50 either on the bus of the circuit as in FIG. 3 or the return line to the battery ground as shown in FIG. 4.

FIG. 5 illustrates a form of voltage protector in the form a switch 100 (specifically a MOSFET switch) arranged in series with the battery 50 and the motor 42 (or the switch network). The switch 100 is activated by a gate 101 sensing a positive voltage on the bus 58 when the battery 50 is installed properly. However, in the event the terminals of the battery 50 are reversed due to improper installation, the negative voltage on the gate 101 will not allow the switch 100 to activate and therefore the switch 100 remains open preventing a completed circuit. The reverse protector circuit 62c includes a zener diode 102 coupled between the gate 101 and source terminals for protecting the switch 100 from too high of voltage.

Figure 1:
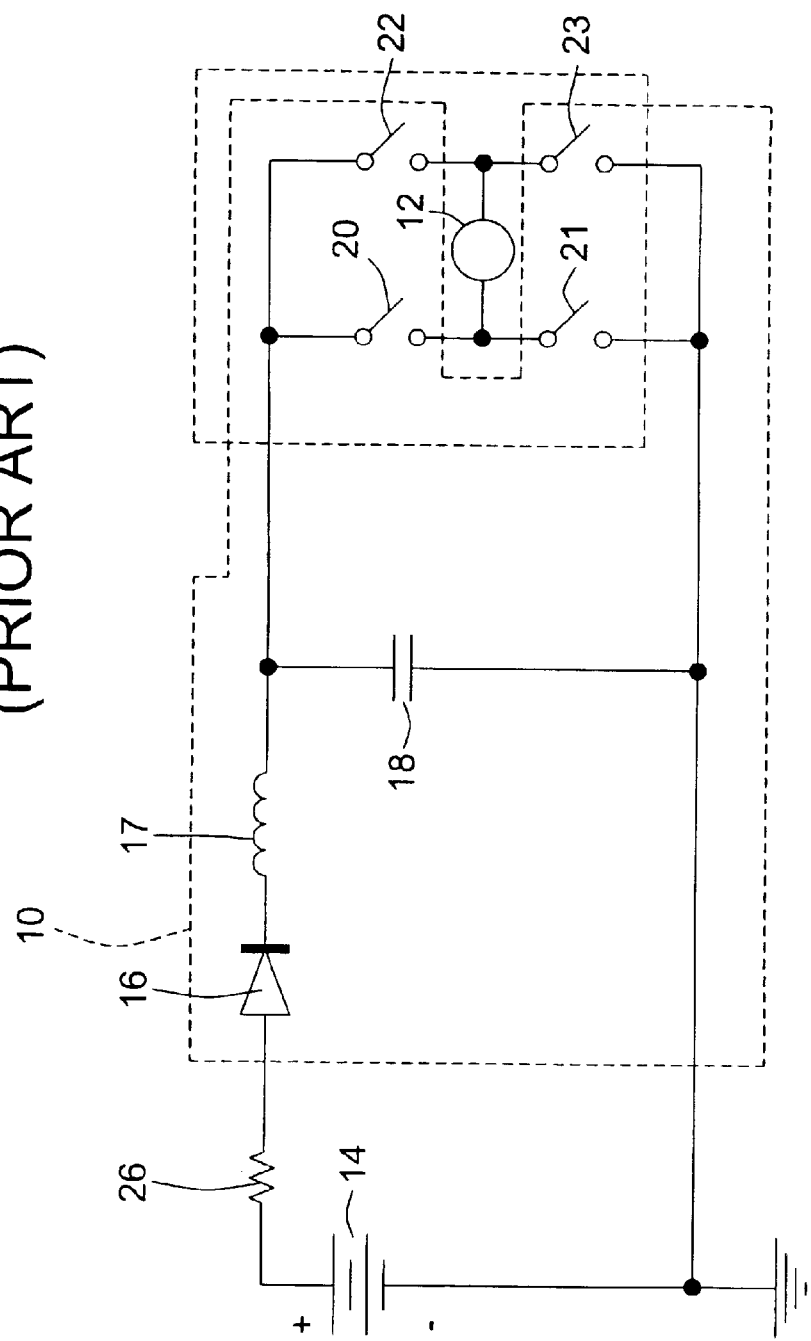
FIG. 1 is a schematic illustration of a prior art motor driver in circuit for driving an electrical motor.

Without a diode as was illustrated in FIGS. 1 and 2, the motor driver 40c of FIG. 5 is capable of allowing inductive flyback current to be stored by the battery 50 if the battery allows. However, in all embodiments the active snubber circuit 68 provides voltage bus stability regardless of whether the battery 50 is capable of absorbing energy, thus acting as a safety. In certain applications, the power source may also be unable to absorb the energy because of its internal make up, or it may be unable to absorb the energy effectively because of the decoupling created by the EMI filter 66, the reverse voltage device, and/or parasitic line impedance. The active snubber circuit 68 also protects the motor driver from over voltage conditions if the power lines were opened while significant current was following in the motor.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A motor driver interposed between an electrical power source and a limited angle torque electrical, motor driven in first and second states, the electrical motor adapted to produce an inductive flyback current when switching between states, comprising
    a reverse voltage protector in series with the electrical power source and the limited angle torque electrical motor allowing proper flow of electrical power to the limited angle torque electrical motor;
    a capacitor arranged in arranged in parallel circuit with the limited angle torque electrical motor between the limited angle torque electrical motor and the reverse voltage protector, the capacitor having a capacitance of between 5 $\mu$F and 500 $\mu$F, the capacitor subject to a high temperature; and
    an active snubber circuit arranged in parallel circuit with the limited angle torque electrical motor, between the reverse voltage protector and the limited angle electrical motor, the active snubber circuit comprising a switch having a sensor responsive to an increase in the bus voltage and a resistor in series with the switch for regulating electrical current flow.

2. The motor driver of claim 1 wherein the motor driver is integral with din limited angle torque electrical motor, wherein the limited angle torque electrical motor produces heat subjecting the capacitor to temperatures in excess of 100° Celsius.

3. The motor driver of claim 1, further comprising an electromagnetic interference filter in series with the limited angle torque electrical motor between the limited angle torque electrical motor and the reverse voltage protector.

4. The motor driver of claim 1 wherein the voltage across the limited angle torque motor is between 8 volts and 32 volts, and wherein the sensor is responsive to a voltage increase of between 36 volts and 50 volts as a result of the inductive flyback current.

5. The motor driver of claim 1 wherein the switch is a metal oxide semiconductor field effect transistor.

6. The motor driver of claim 1 wherein the electrical motor is driven in an H-bridge switch network configuration comprising four motor switches, including a first series of first and second switches in series and a second series of third and fourth switches in series, the motor connecting first and second series at a location between the first and second switches and between the third and fourth switches, wherein the motor is selectively modulated between two of three states to produce a selected torque in a selected angular direction including a first state where the first and fourth switches are closed, a second state where the second and third switches are closed, and a third state where the second and fourth switches are closed.

7. The motor driver of claim 1 wherein the reverse voltage protector comprises a diode.

8. The motor driver of claim 1 wherein the reverse voltage protector comprises a second switch having a second sensor responsive to voltage on the bus, the second switch remaining passively open when there is no voltage on the bus preventing flow of electrical power to the motor if terminals of the electrical power source are hooked up to the motor driver in a reverse manner.

9. The motor driver of claim 8 wherein the second sensor comprises a zener diode in parallel with a gate terminal of the second switch and a sowte terminal of the second transistor and a resistor connected to the gate terminal and the electrical power source.

10. A motor driver interposed between electrical power source and a limited angle torque electrical motor, wherein the electrical motor is arranged driven in an H-bridge switch network configuration comprising four motor switches, including a first series of first and second switches in series and a second series of third and fourth switches in series, the motor connecting first and second series at a location between the first and second switches and between the third end fourth switches, wherein the motor is selectively modulated between two of three states to produce a selected torque output in a selected angular direction including a first state where the first and fourth switches are closed, a second state where the second and third switches are closed, and a third state where the second and fourth switches are closed, the electrical motor adapted to produce an inductive flyback current when switching between states, the motor driver being integral with the electrical motor and comprising:
    a reverse voltage protector in series between the electrical power source and the electrical motor allowing proper flow of electrical power to the electrical motor,
    a capacitor arranged in parallel circuit with the motor between electrical motor and a diode, wherein the electrical motor produces heat subjecting the capacitor to temperatures in excess of 100° Celsius; and
    an active snubber circuit arranged in parallel circuit with the electrical motor between the reverse voltage protector and the electrical motor, the active snubber circuit comprising a switch having a sensor responsive to the inductive flyback current and a resistor in series with the switch for regulating electrical current flow.

11. The motor driver of claim 10 wherein the capacitor has a capacitance of between 5 $\mu$F and 500 $\mu$F.

12. The motor driver of claim 11 wherein the voltage across the motor is between 8 volts and 32 volts, and wherein the sensor is responsive to a voltage increase of between 36 volts and 50 volts as a result of the inductive flyback current.

13. The motor driver of claim 12 wherein the switch is a metal oxide semiconductor field effect transistor.

14. The motor driver of claim 13 wherein the resistor has a relatively low resistance of between 1 $\Omega$ and 3 $\Omega$.

15. The motor driver of claim 11 wherein the reverse voltage protector comprises a diode.

16. The motor driver of claim 11 wherein the reverse voltage protector comprises a second switch having a second sensor responsive to voltage on the bus, the second switch remaining passively open when there is no voltage on the bus preventing flow of electrical power to the motor if terminals of the electrical power source are hooked up to the motor driver in a reverse manner.

17. The motor driver of claim 16 wherein the second sensor comprises a zener diode in parallel with a gate terminal of the second switch and a source terminal of the second transistor and a resistor connected to the gate terminal and the electrical power source.

18. The motor drive of claim 11 further comprising an electromagnetic interference filter in series with the limited angle torque motor between the limited angle torque motor and the reverse voltage protector.

* * * * *

UNITED STATES PATENT AND TRADEMARK OFFICE
CERTIFICATE OF CORRECTION

PATENT NO.   : 6,738,239 B2
DATED        : May 18, 2004
INVENTOR(S)  : David C. Petruska It is certified that error appears in the above-identified patent and that said Letters Patent is hereby corrected as shown below:

<u>Column 5,</u>
Line 43, change "with din limited" to -- with the limited --.

<u>Column 6,</u>
Line 17, change "and a sowte terminal" to -- and a source terminal --.
Line 28, change "end fourth switches" to -- and fourth switches --.

Signed and Sealed this

Thirtieth Day of November, 2004

JON W. DUDAS
*Director of the United States Patent and Trademark Office*